(12) United States Patent
Kwak et al.

(10) Patent No.: US 7,852,959 B2
(45) Date of Patent: Dec. 14, 2010

(54) METHOD OF TRANSMITTING CONTROL SIGNAL IN WIRELESS COMMUNICATION SYSTEM

(75) Inventors: Jin Sam Kwak, Anyang-si (KR); Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/602,320

(22) PCT Filed: May 30, 2008

(86) PCT No.: PCT/KR2008/003035

§ 371 (c)(1),
(2), (4) Date: Nov. 30, 2009

(87) PCT Pub. No.: WO2008/147131

PCT Pub. Date: Dec. 4, 2008

(65) Prior Publication Data

US 2010/0177804 A1 Jul. 15, 2010

(30) Foreign Application Priority Data

May 30, 2007 (KR) .................... 10-2007-0052874

(51) Int. Cl.
*H04K 1/10* (2006.01)
*H04L 27/28* (2006.01)

(52) U.S. Cl. .............. 375/260; 375/135; 375/133; 375/141; 375/146; 375/140; 370/320; 370/319; 370/335; 370/344

(58) Field of Classification Search ............... 375/260, 375/132, 133, 135, 140, 141, 146; 370/320, 370/319, 335, 344
See application file for complete search history.

(56) References Cited

U.S. PATENT DOCUMENTS

| 7,417,964 | B2 * | 8/2008 | Cho et al. | 370/319 |
| 7,796,575 | B2 * | 9/2010 | Lim et al. | 370/342 |
| 2006/0009224 | A1 | 1/2006 | Lim et al. | |
| 2006/0018411 | A1 * | 1/2006 | Gore et al. | 375/340 |
| 2006/0153282 | A1 * | 7/2006 | Jung et al. | 375/146 |
| 2006/0274710 | A1 * | 12/2006 | Lim et al. | 370/342 |
| 2007/0195906 | A1 * | 8/2007 | Kim et al. | 375/267 |

FOREIGN PATENT DOCUMENTS

JP 2005-341055 A 12/2005

(Continued)

*Primary Examiner*—Phuong Phu
(74) *Attorney, Agent, or Firm*—Birch, Stewart, Kolasch & Birch, LLP

(57) ABSTRACT

A method of transmitting a control signal in a wireless communication system includes allocating a first sequence to spread a first control signal in a radio resource, allocating a second sequence to spread a second control signal in the radio resource, selecting one of the first control signal and the second control signal, generating a spread control signal by spreading the selected control signal, and transmitting the spread control signal in the radio resource, wherein the first sequence and the second sequence use different cyclic shifts of a base sequence.

12 Claims, 14 Drawing Sheets

FOREIGN PATENT DOCUMENTS

| | | |
|---|---|---|
| KR | 10-2006-0081876 A | 7/2006 |
| KR | 10-2008-0076131 A | 8/2008 |
| WO | WO-00/65736 A1 | 11/2000 |
| WO | WO-2006/031239 A1 | 3/2006 |

* cited by examiner

[Fig. 1]
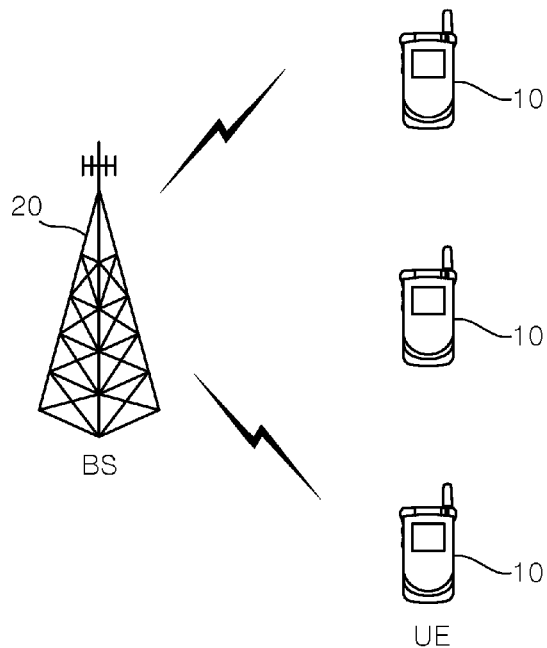
[Fig. 2]
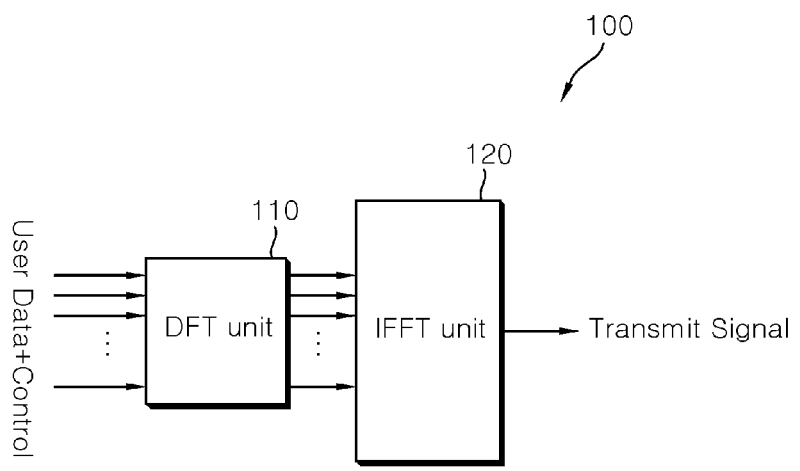
[Fig. 3]
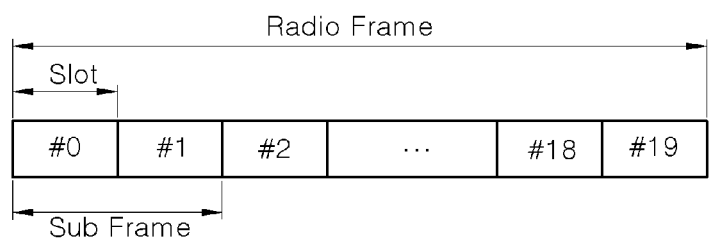

[Fig. 4]
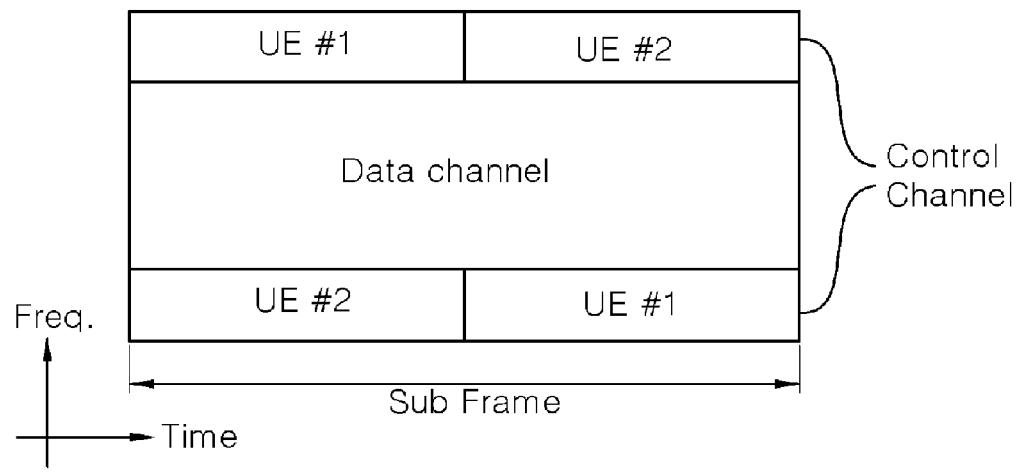
[Fig. 5]
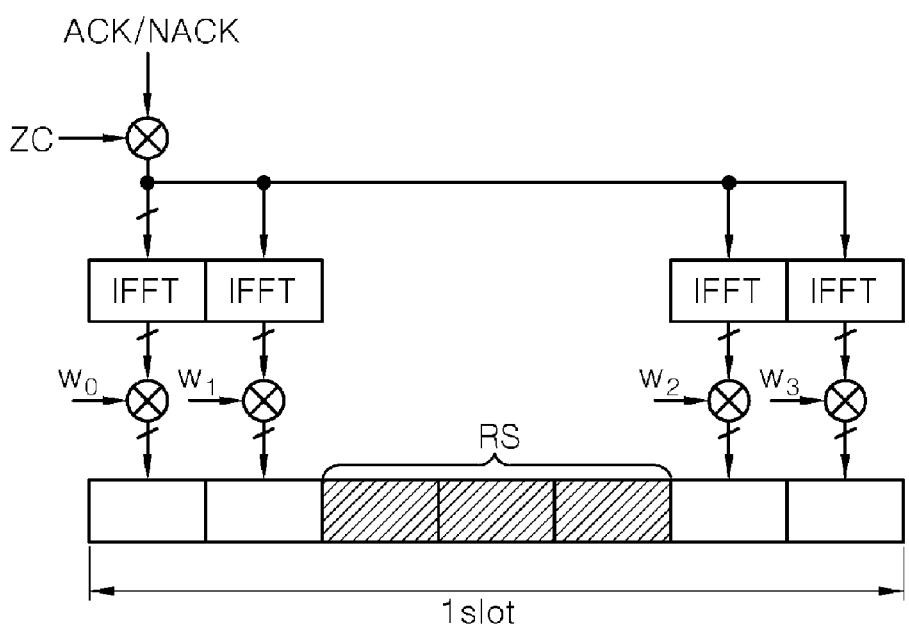

[Fig. 6]
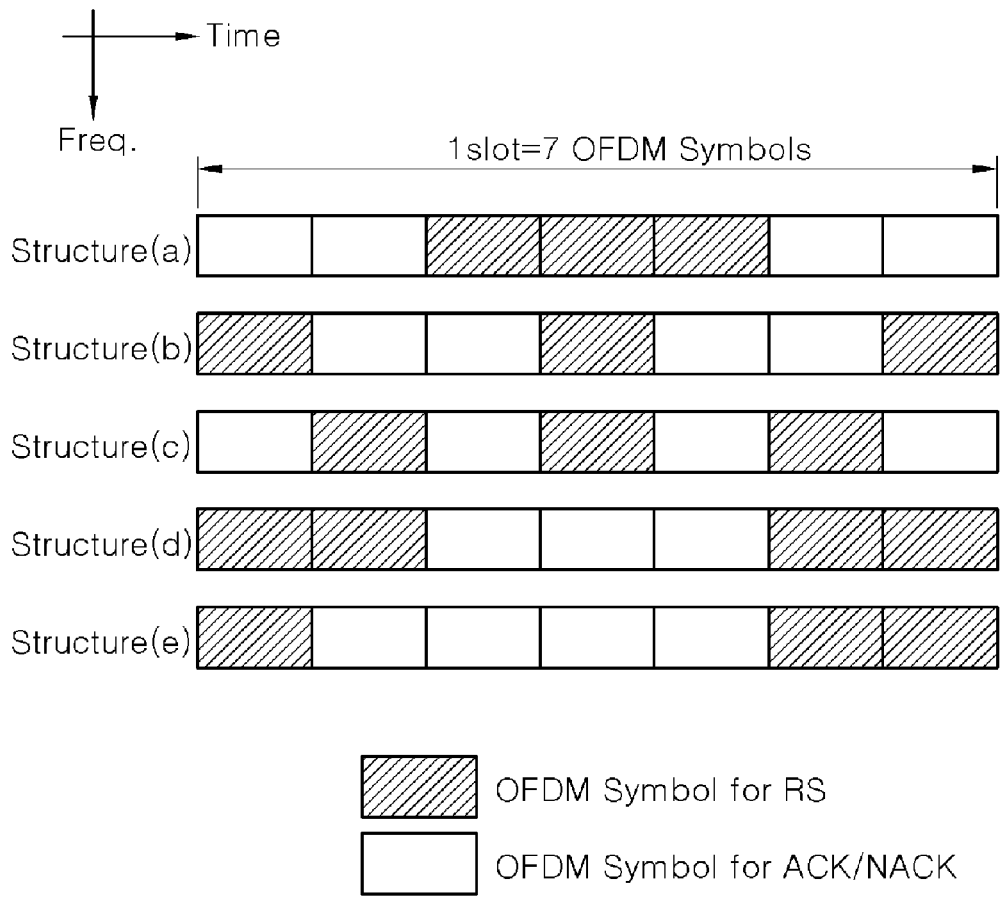
[Fig. 7]
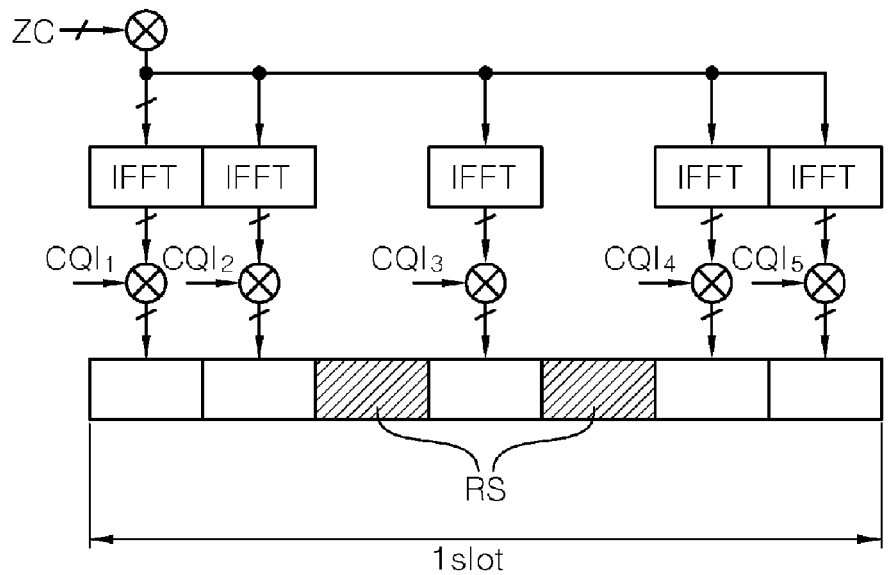

[Fig. 8]
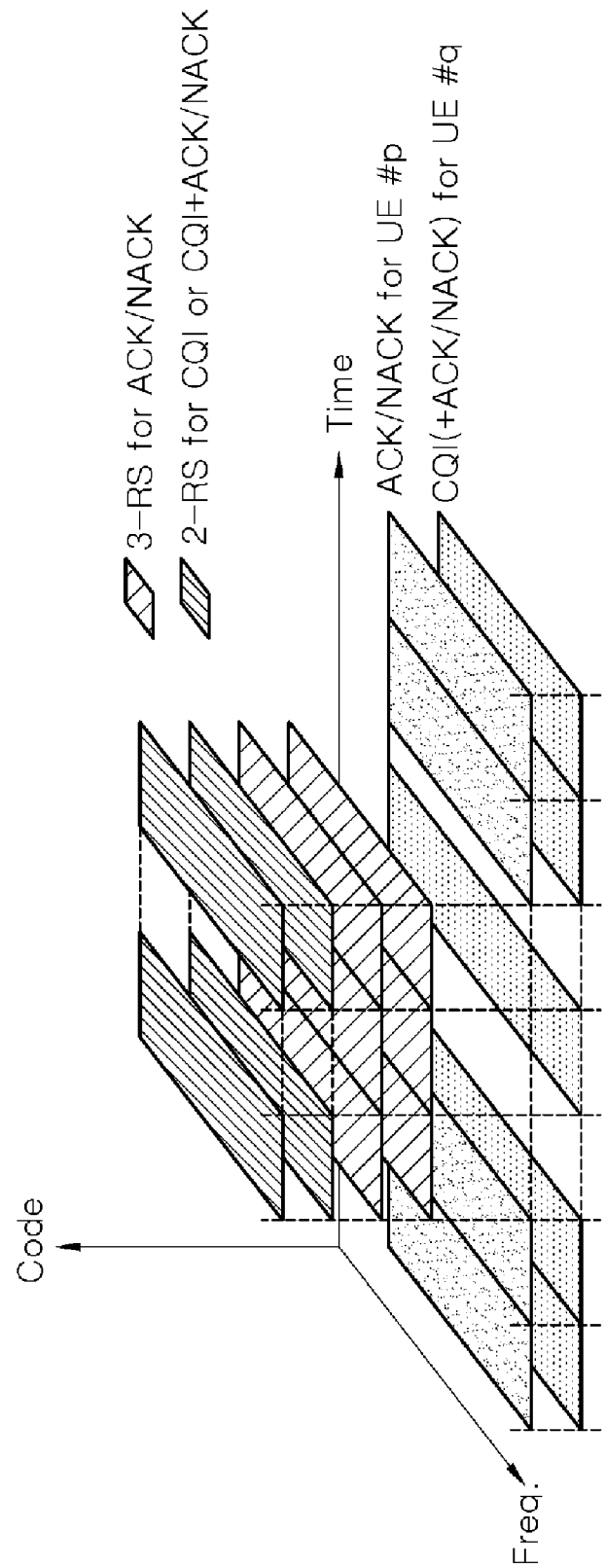

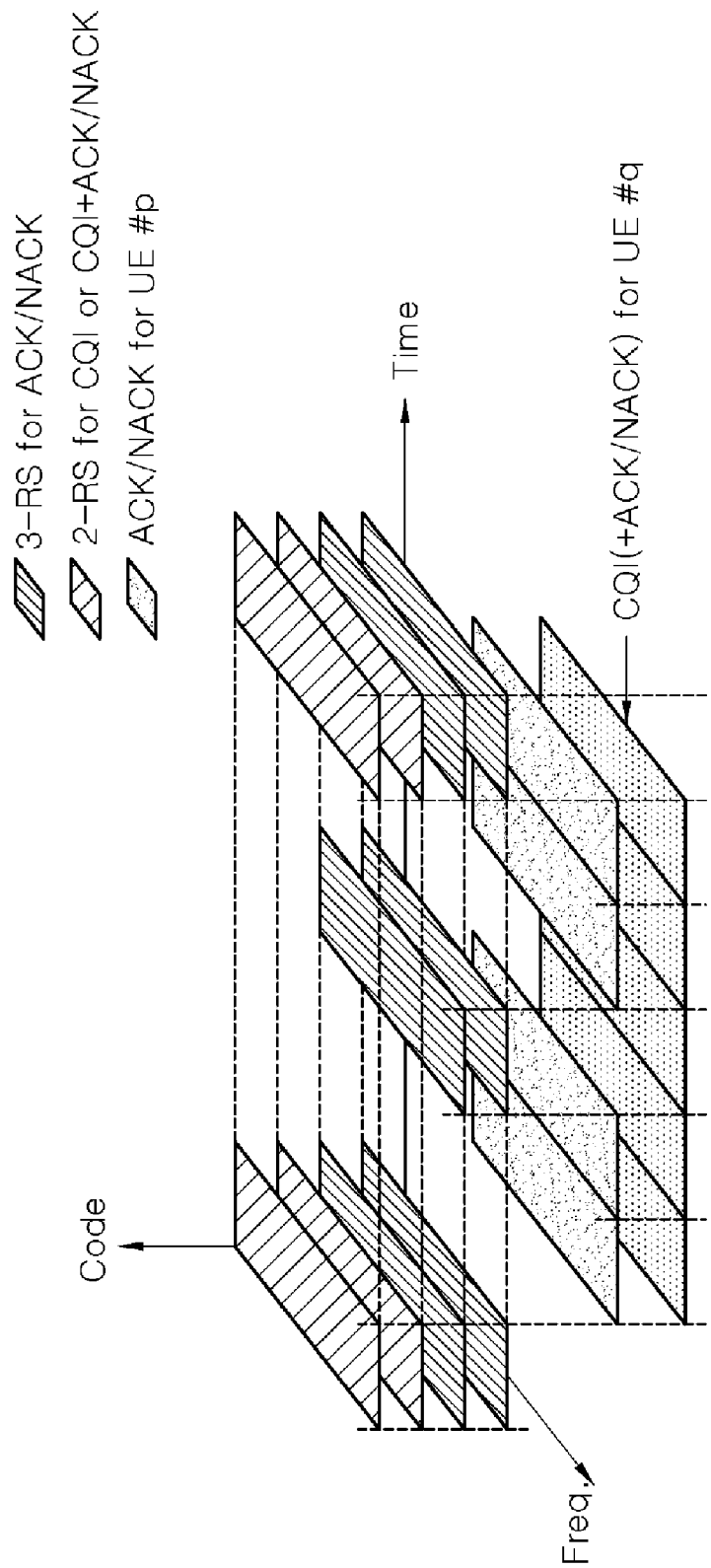
[Fig. 9]

[Fig. 10]
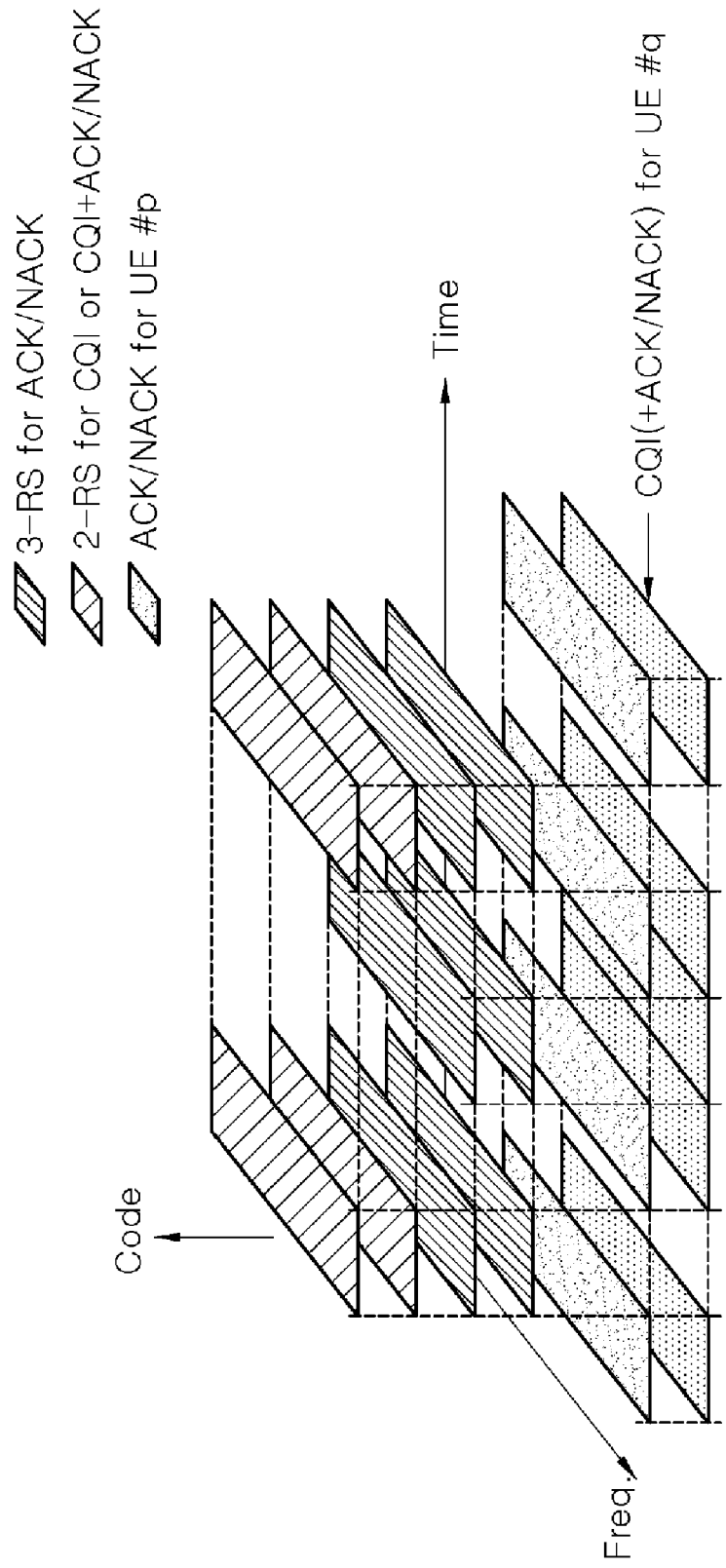

[Fig. 11]
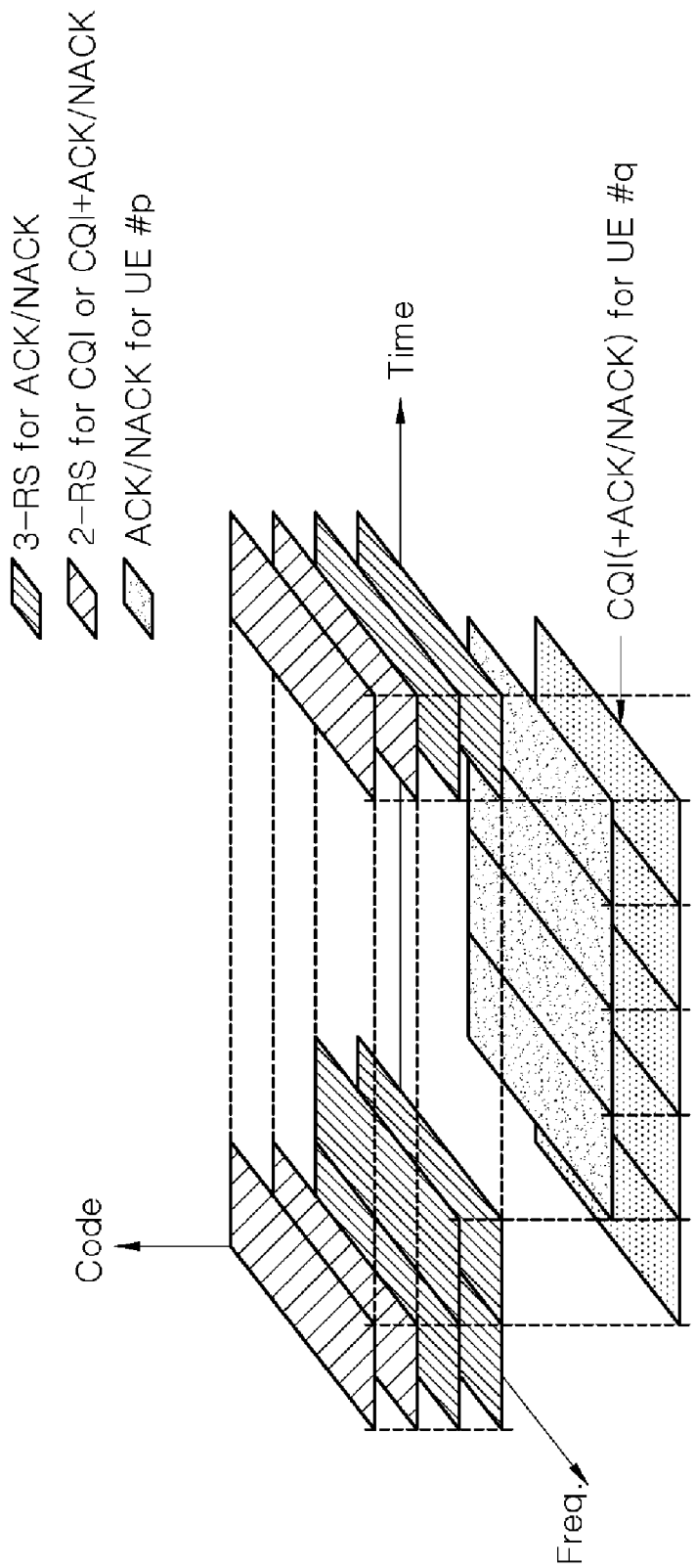

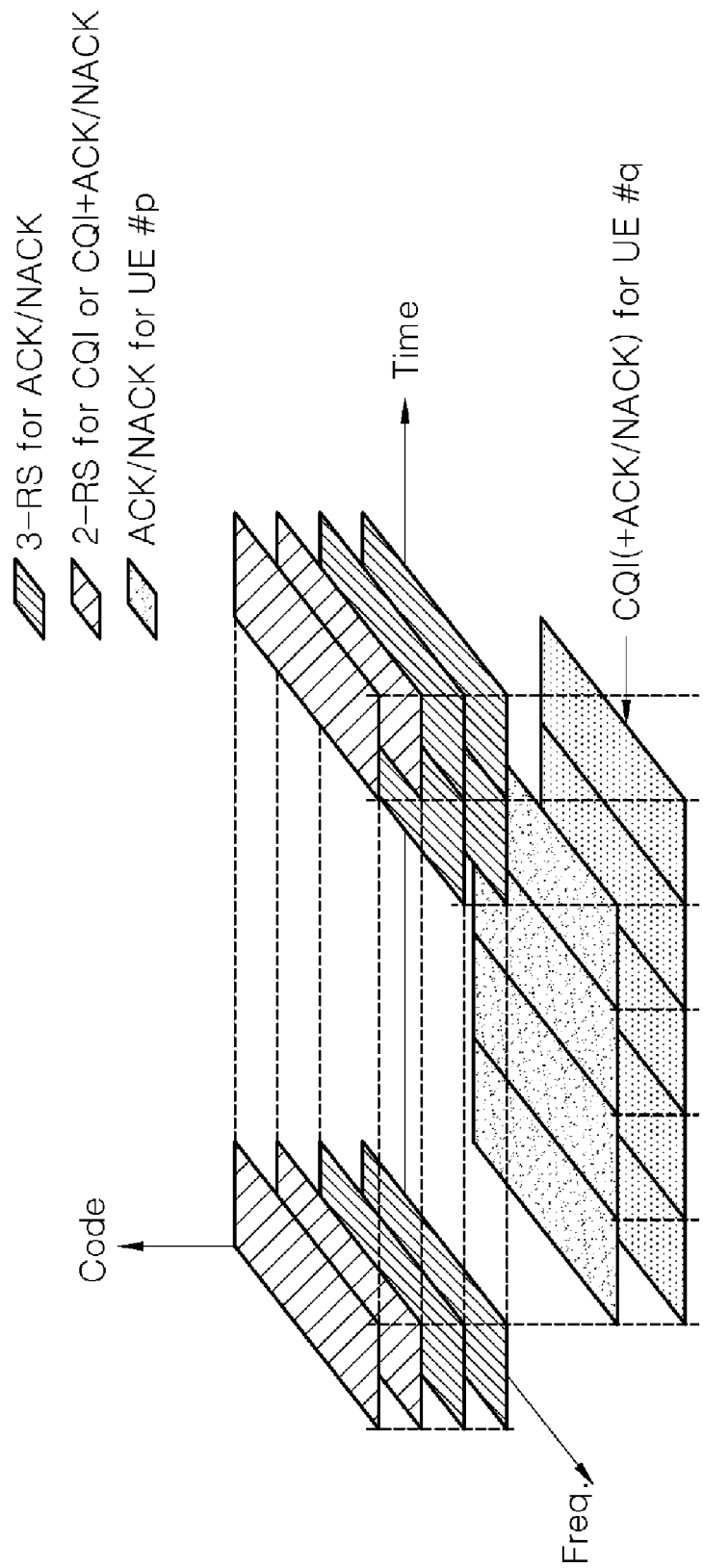
[Fig. 12]

[Fig. 13]
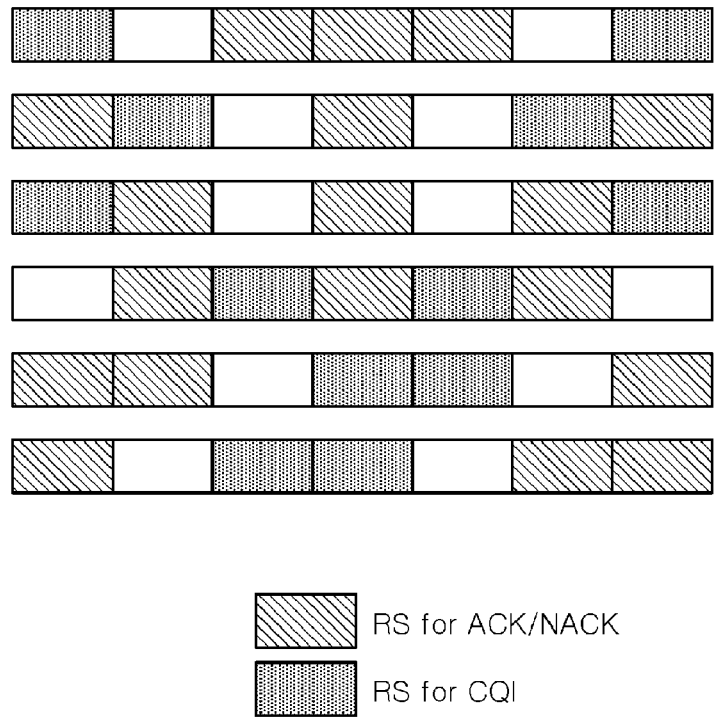
[Fig. 14]
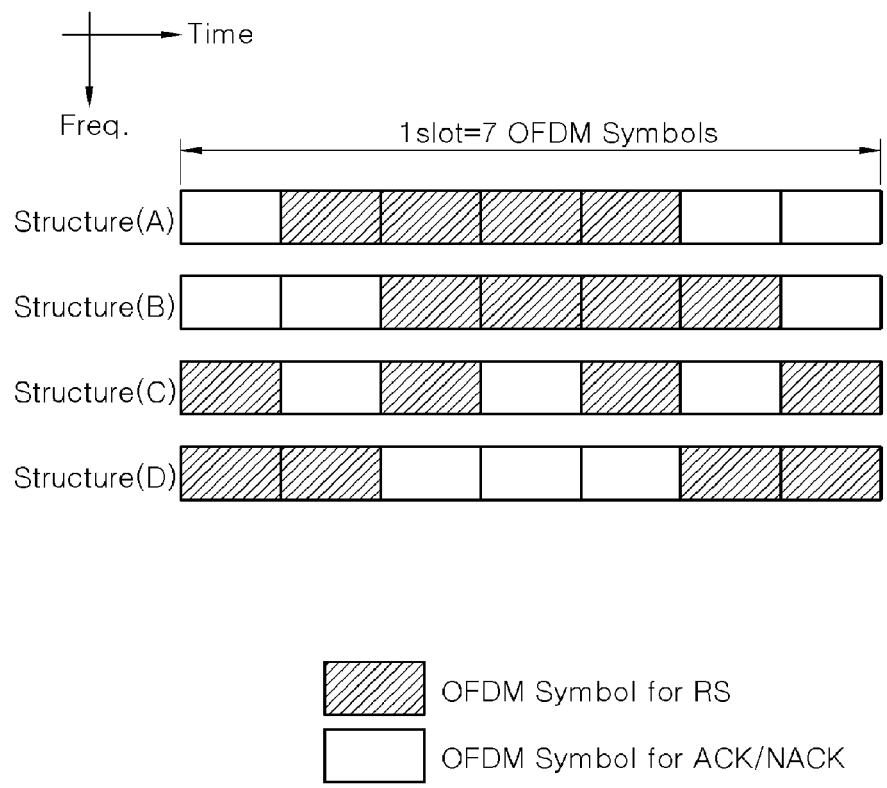

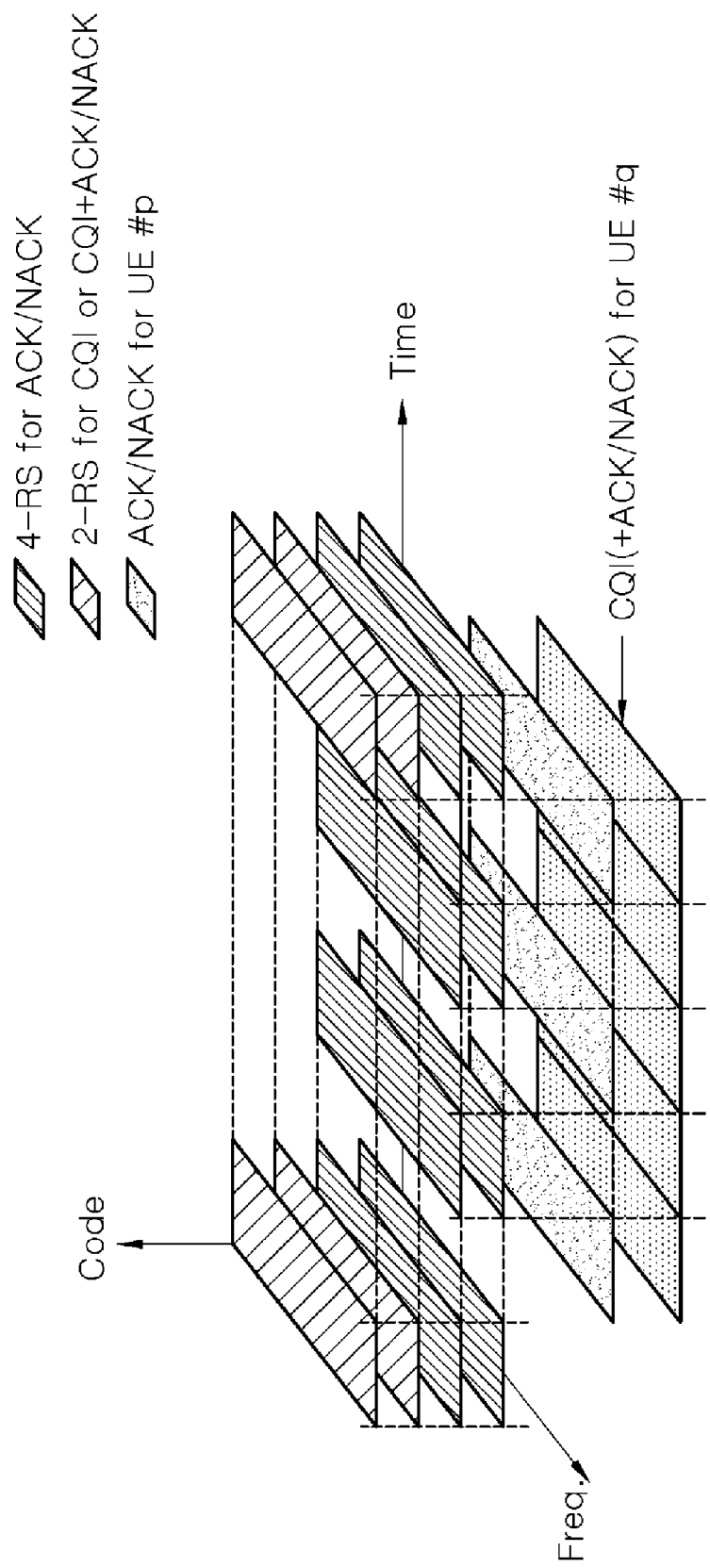
[Fig. 15]

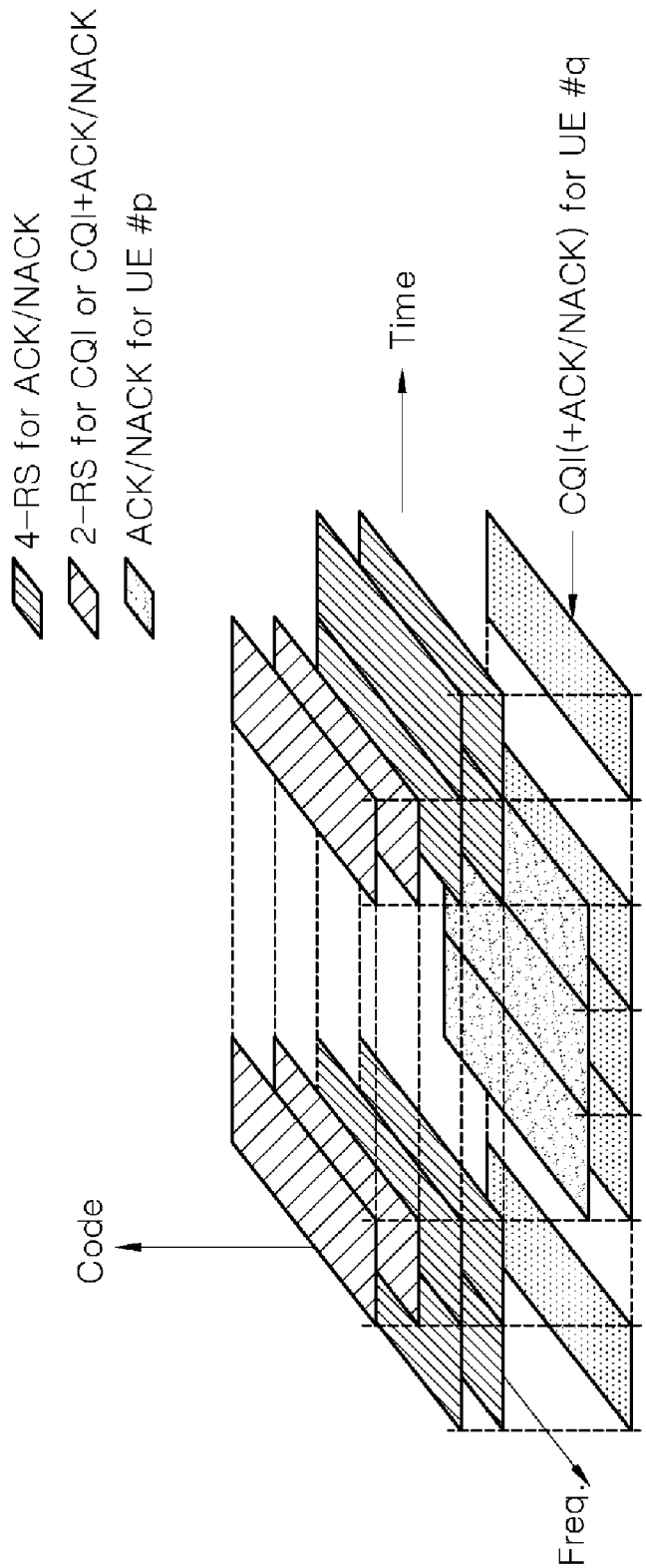
[Fig. 16]

[Fig. 17]
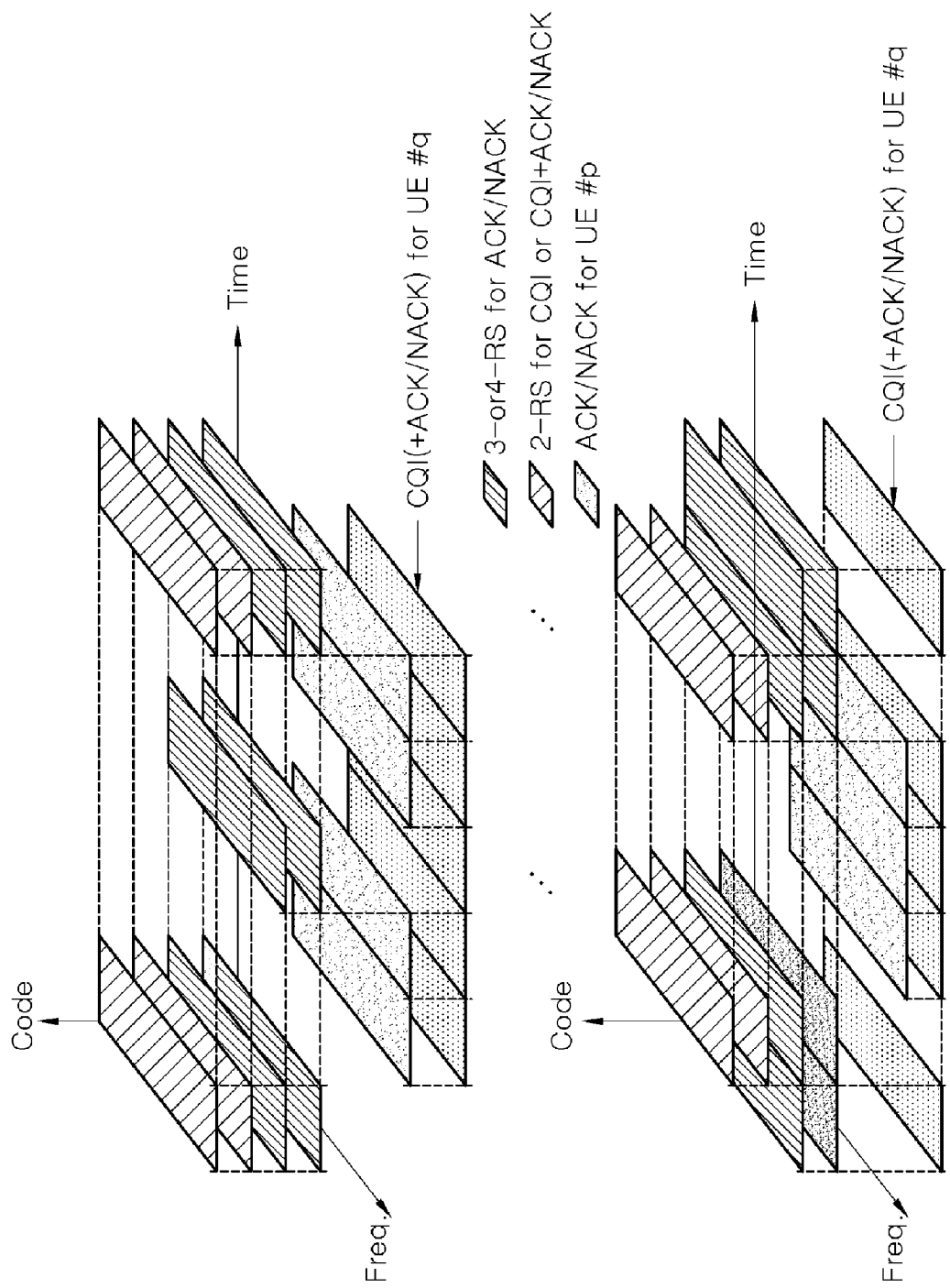

[Fig. 18]
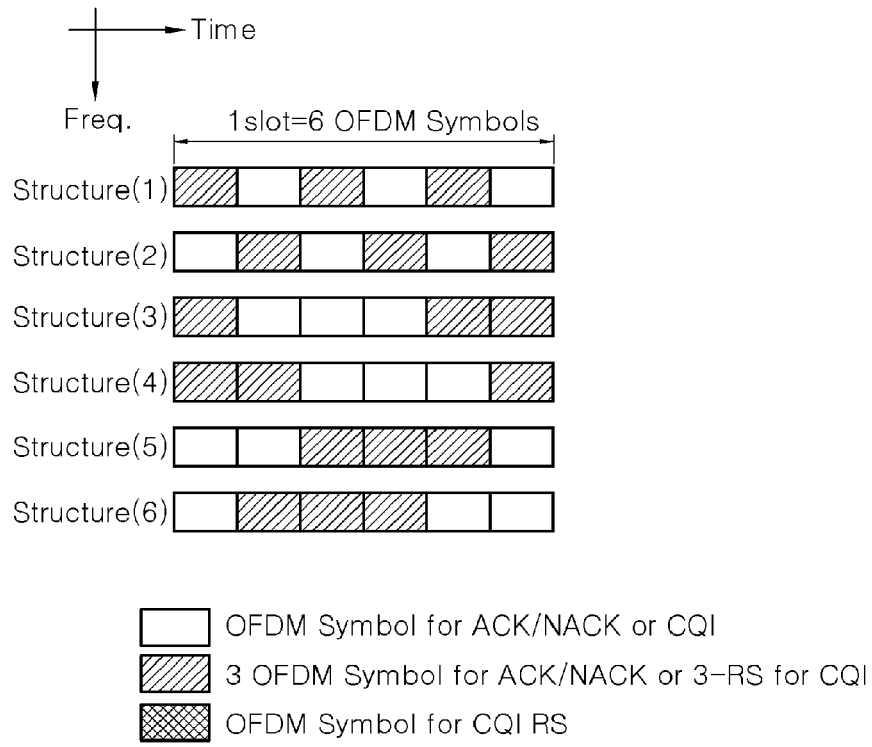
[Fig. 19]
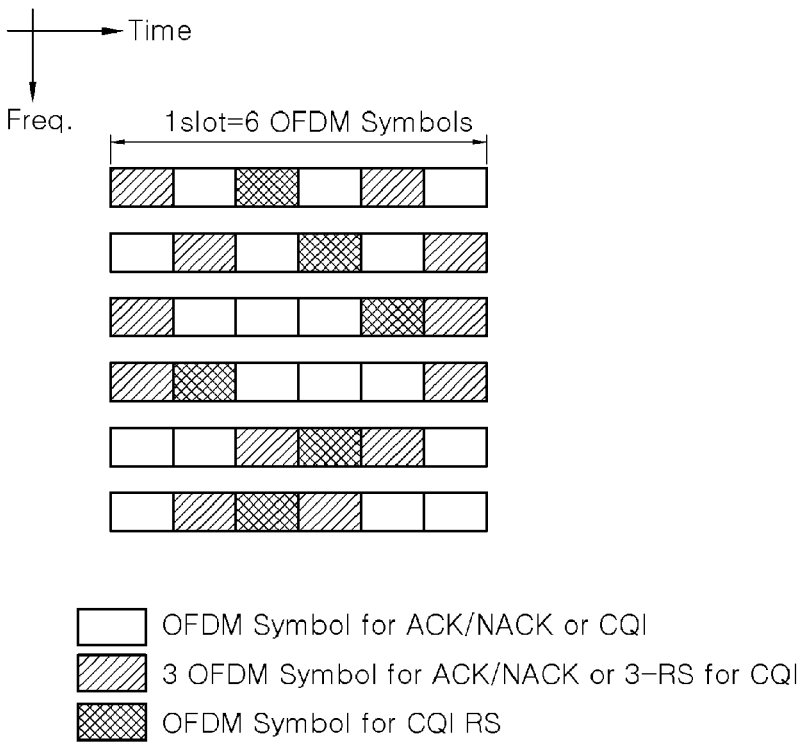

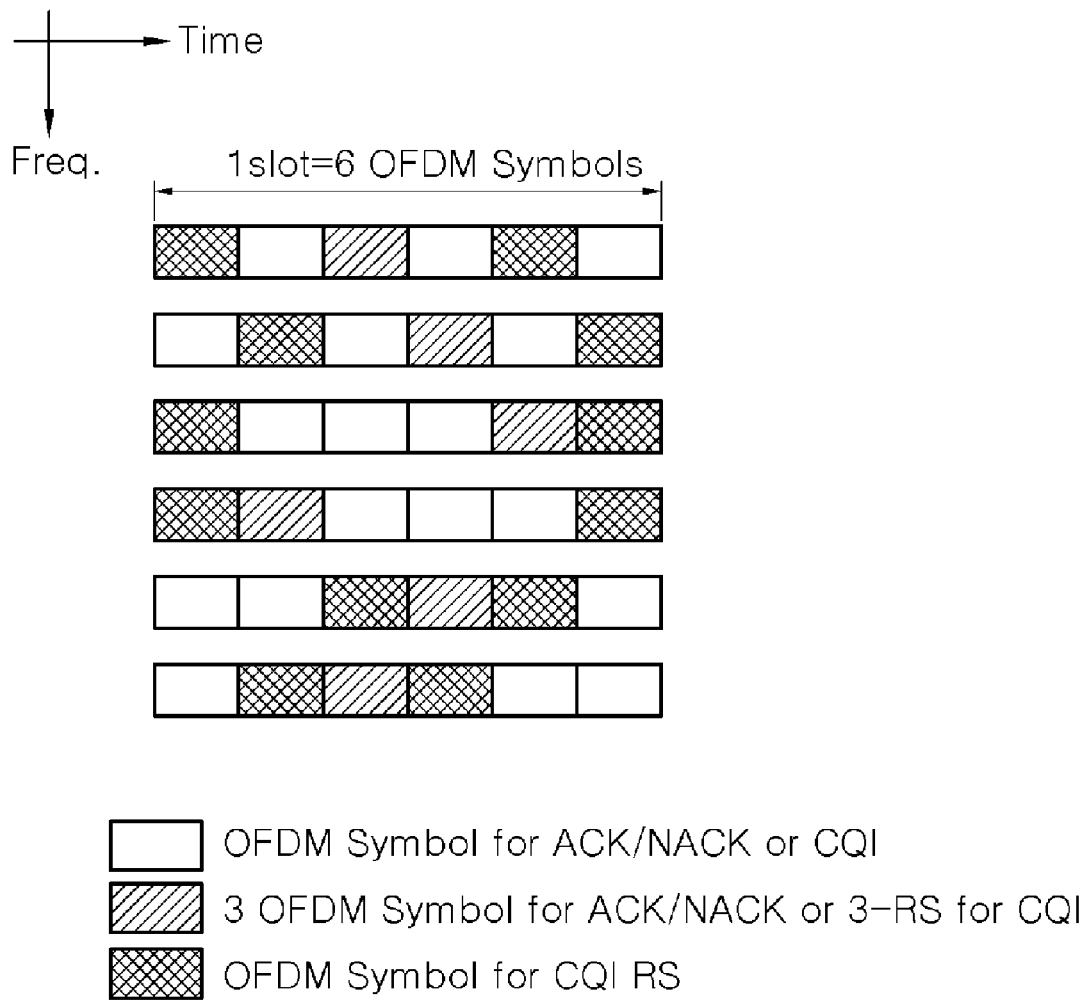
[Fig. 20]

METHOD OF TRANSMITTING CONTROL SIGNAL IN WIRELESS COMMUNICATION SYSTEM

TECHNICAL FIELD

The present invention relates to wireless communications, and more particularly, to a method of transmitting a control signal robust to a time-varying channel by using frequency domain spreading and/or time domain spreading in a wireless communication system.

BACKGROUND ART

In next generation multimedia mobile communication systems, which have been actively studied in recent years, there is a demand for a system capable of processing and transmitting a variety of information (e.g., video and wireless data) in addition to the early voice-oriented services. In order to maximize efficiency of a limited radio resource in the mobile communication systems, methods for more effectively transmitting data in time, spatial, and frequency domains have been provided.

Orthogonal frequency division multiplexing (OFDM) uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM, complexity of the receiver can be reduced in a frequency selective fading environment of a broadband channel, and spectral efficiency can be increased when selective scheduling is performed in a frequency domain by using a channel characteristic which is different from one subcarrier to another. Orthogonal frequency division multiple access (OFDMA) is an OFDM-based multiple access scheme. According to the OFDMA, efficiency of radio resources can be increased by allocating different subcarriers to multiple users.

To maximize efficiency in the spatial domain, the OFDM/OFDMA-based system uses a multi-antenna technique which is used as a suitable technique for high-speed multimedia data transmission by generating a plurality of time and frequency domains in the spatial domain. The OFDM/OFDMA-based system also uses a channel coding scheme for effective use of resources in the time domain, a scheduling scheme which uses a channel selective property of a plurality of users, a hybrid automatic repeat request (HARM) scheme suitable for packet data transmission, etc.

In order to implement various transmission or reception methods to achieve high-speed packet transmission, transmission of a control signal on the time, spatial, and frequency domains is an essential and indispensable factor. A channel for transmitting the control signal is referred to as a control channel. There are on-going active discussions on various methods in which the transmitter performs effective re-transmission according to feedback information received from the receiver in order to maximize efficiency of limited radio resources.

Since system reliability is dependent on reliability of the control signal, the control signal needs to be detected from the control channel with higher reliability. Therefore, there is a need for a control channel structure robust to a variable channel environment while increasing user equipment capability and transmission capability.

DISCLOSURE OF INVENTION

Technical Problem

The present invention provides a method of transmitting a control signal for improving reliability of coherent detection while increasing user equipment capability and transmission capability.

The present invention also provides a method of transmitting a control signal robust to a time-varying channel environment.

Technical Solution

In an aspect, a method of transmitting a control signal in a wireless communication system includes allocating a first sequence to spread a first control signal in a radio resource, allocating a second sequence to spread a second control signal in the radio resource, selecting one of the first control signal and the second control signal, generating a spread control signal by spreading the selected control signal, and transmitting the spread control signal in the radio resource, wherein the first sequence and the second sequence use different cyclic shifts of a base sequence.

The radio resource can be one resource block which is defined by a plurality of subcarriers and a plurality of orthogonal frequency division multiplexing (OFDM) symbols. The spread control signal can be generated by spreading the first control signal with the first sequence and an orthogonal sequence when the first control signal is selected.

In another aspect, a method of transmitting a control signal in a wireless communication system includes transmitting a first control signal on a first uplink control channel, the first control signal being spread with a first cyclic shift of a base sequence, and transmitting a second control signal on a second uplink control channel, the second control signal being spread with a second cyclic shift of the base sequence, wherein the first uplink control channel uses the same radio resource with the second uplink control channel.

Advantageous Effects

Reliability of coherent signal detection can be improved by minimizing impairment of orthogonality when de-spreading is performed in a time-varying channel environment. Therefore, a control signal can be transmitted more reliably.

BRIEF DESCRIPTION OF THE DRAWINGS

FIG. 1 shows a structure of a wireless communication system.

FIG. 2 is a block diagram of a transmitter according to an embodiment of the present invention.

FIG. 3 shows an exemplary structure of a radio frame.

FIG. 4 shows an example of slot allocation in one uplink subframe.

FIG. 5 shows an exemplary structure of a control channel for transmitting a control signal according to an embodiment of the present invention.

FIG. 6 shows a control channel structure in which 3 orthogonal frequency division multiplexing (OFDM) symbols are arranged for a reference signal.

FIG. 7 shows an exemplary structure of a control channel for transmitting a channel quality indicator (CQI).

FIG. 8 shows a CQI multiplexing method using a channel structure (a) of FIG. 6.

FIG. 9 shows a CQI multiplexing method using a channel structure (b) of FIG. 6.

FIG. 10 shows a CQI multiplexing method using a channel structure (c) of FIG. 6.

FIG. 11 shows a CQI multiplexing method using a channel structure (d) of FIG. 6.

FIG. 12 shows a CQI multiplexing method using a channel structure (e) of FIG. 6.

FIG. 13 shows arrangement of a reference signal for acknowledgement (ACK)/not-acknowledgement (NACK) and a reference signal for CQI.

FIG. 14 shows a control channel structure in which 4 OFDM symbols are arranged for a reference signal.

FIG. 15 shows a CQI multiplexing method using a channel structure (C) of FIG. 14.

FIG. 16 shows a CQI multiplexing method using a channel structure (D) of FIG. 14.

FIG. 17 shows an example of slot-based frequency hopping.

FIG. 18 shows a control channel structure for a slot including 6 OFDM symbols.

FIG. 19 shows an example of CQI multiplexing using a control channel structure of FIG. 18.

FIG. 20 shows another example of CQI multiplexing using a control channel structure of FIG. 18.

MODE FOR THE INVENTION

FIG. 1 shows a structure of a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink is defined as a communication from the BS 20 to the UE 10, and an uplink is defined as a communication from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

FIG. 2 is a block diagram of a transmitter according to an embodiment of the present invention.

Referring to FIG. 2, a transmitter 100 includes a discrete Fourier transform (DFT) unit 110 that performs DFT and an Inverse fast Fourier transform (IFFT) unit 120 that performs IFFT. The DFT unit 110 performs DFT on data and outputs a frequency-domain symbol. The data input to the DFT unit 110 may be a control signal and/or user data. The IFFT unit 120 performs IFFT on the received frequency-domain symbol and outputs a transmit (Tx) signal. The Tx signal is a time-domain signal. A time-domain symbol output from the IFFT unit 120 is referred to as an orthogonal frequency division multiplexing (OFDM) symbol or a single carrier-frequency division multiple access (SC-FDMA) symbol. SC-FDMA is a scheme in which spreading is achieved by performing DFT in a previous stage of the IFFT unit 120. The SC-FDMA scheme is advantageous over an OFDM scheme in terms of decreasing a peak-to-average power ratio (PAPR).

Although the SC-FDMA scheme is described herein, multiple access schemes used in the present invention are not limited thereto. For example, various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc.

Different multiple access schemes may be used for uplink and downlink in the wireless communication system. For example, the SC-FDMA scheme may be used for uplink, and the OFDMA scheme may be used for downlink.

FIG. 3 shows an exemplary structure of a radio frame.

Referring to FIG. 3, the radio frame includes 10 subframes. One subframe includes two consecutive slots. A time for transmitting one subframe is defined as a transmission time interval (TTI). For example, when the TTI is 1 ms, a time for transmitting one radio frame is 10 ms. One slot can include a plurality of OFDM symbols in a time domain and at least one subcarrier in a frequency domain. The slot is a unit of radio resource allocation in the time domain and the frequency domain. For example, one slot can include 7 or 6 OFDM symbols. A resource block is defined by a slot in the time domain and a plurality of subcarriers in the frequency domain, and is a basic unit of radio resource allocation. It is assumed hereinafter that one resource block is defined by one slot and 12 subcarriers.

The radio frame structure is shown for exemplary purposes only, and thus the number of subframes included in the radio frame or the number of slots included in the subframe is not limited thereto.

FIG. 4 shows an example of slot allocation in one uplink subframe.

Referring to FIG. 4, the uplink subframe can be divided into two parts, that is, a control channel and a data channel. The control channel carries a control signal. The data channel carries user data and/or the control signal. The control channel and the data channel are configured within one subframe. However, in order to maintain a single-carrier property, the control channel and the data channel cannot be simultaneously transmitted by one UE within one subframe.

Examples of the uplink control signal include an acknowledgement (ACK)/not-acknowledgement (NACK) signal for hybrid automatic repeat request (HARM), a channel quality indicator (CQI) indicating a downlink channel condition, a precoding matrix index (PMI) for multiple input multiple output (MIMO) operation, a rank indicator (RI), etc. The control channel carries only the control signal. The data channel may carry both the user data and the control signal.

Herein, a system bandwidth is divided into three parts, wherein two parts at both ends are used as the control channel and a middle part thereof is used as the data channel. Since the control channel and the data channel use different frequencies, frequency division multiplexing (FDM) have been achieved. This is for exemplary purposes only, and thus the arrangement of the control channel and the data channel in the subframe is not limited thereto.

The slot allocated to each UE can be frequency-hopped in the subframe. That is, one of two slots included in one subframe may be carried on one side of the control channel, and the other slot may be carried on the other side of the control channel. A frequency diversity gain can be obtained by transmitting the respective control channels through the slots allocated to different frequencies.

FIG. 5 shows an exemplary structure of a control channel for transmitting a control signal according to an embodiment of the present invention. Although it is assumed for clarity that one slot includes 7 OFDM symbols, the present invention is not limited thereto. When the control signal is transmitted within a pre-assigned band, frequency-domain spreading and time-domain spreading are both used in order to increase capability of the control channel.

Referring to FIG. 5, among the 7 OFDM symbols, a reference signal (or simply referred to as an RS) is carried on 3 OFDM symbols and an ACK/NACK signal is carried on the remaining 4 OFDM symbols. The reference signal is carried on 3 contiguous OFDM symbols. The ACK/NACK signal is a transmission and/or reception confirm signal and has a size of 1 bit. Although the ACK/NACK signal is used as a control signal carried on the control channel as an example, other types of control signals may be carried on the control channel.

A frequency-domain spreading code is used to spread the ACK/NACK signal in a frequency domain. A first orthogonal sequence is used as the frequency-domain spreading code. The first orthogonal sequence may be a constant amplitude zero auto-correlation (CAZAC) sequence. If the ACK/NACK signal is assigned to one resource block, a CAZAC sequence having a length of 12 is used.

One example of the CAZAC sequence is a Zadoff Chu (ZC) sequence. A ZC sequence c(k) having a length of N can be expressed as shown:

*MathFigure 1*

$$c(k) = \begin{cases} e^{-j\frac{\pi Mk(k+1)}{N}} & \text{for odd } N \\ e^{-j\frac{\pi Mk^2}{N}} & \text{for even } N \end{cases} \quad [\text{Math. 1}]$$

where $0 \leq k \leq N-1$, and M is a root index and is a natural number less than or equal to N. N is a relatively prime to M. This means that, once N is determined, the number of root indices is equal to the number of available ZC sequences.

The ZC sequence c(k) has three characteristics as follows.

MathFigure 2

$$|c(k;N,M)|1=1 \text{ for all } k, N, M \quad [\text{Math.2}]$$

*MathFigure 3*

$$R_{M;N}(d) = \begin{cases} 1, & \text{for } d = 0 \\ 0, & \text{for } d \neq 0 \end{cases} \quad [\text{Math. 3}]$$

MathFigure 4

$$R_{M_1,M_2;N}(d)=p \text{ for all } M_1 M_2 \quad [\text{Math.4}]$$

Equation 2 shows that the ZC sequence always has a magnitude of '1'. Equation 3 shows that auto-correlation of the ZC sequence is indicated by a Dirac-delta function. The auto-correlation is based on circular correlation. Equation 4 shows that cross correlation is always constant.

The ACK/NACK signal is spread over the frequency domain and then IFFT is performed on the ACK/NACK signal. Thereafter, the ACK/NACK signal is spread over a time domain by using a second orthogonal sequence which is a time-domain spreading code. The second orthogonal sequence may be a Walsh code. Herein, spreading is carried out by using 4 Walsh codes $w_0$, $w_1$, $w_2$, and $w_3$ for respective 4 OFDM symbols.

The present invention is not limited to the order of performing frequency-domain spreading and time-domain spreading. Thus, the time-domain spreading may be performed prior to the frequency-domain spreading.

It has been described that the ZC sequence is used as the first orthogonal sequence which is the frequency-domain spreading code, and the Walsh code is used as the second orthogonal sequence which is the time-domain spreading code. However, the present invention is not limited thereto. Thus, a DFT code or other codes having excellent correlation characteristics may also be used.

The number of supportable control channels can be increased when the control signal is two-dimensionally spread over both the frequency domain and the time domain. Assume that the length of first orthogonal spreading code in the frequency domain is 6. Then, 6 first orthogonal sequences can be obtained by cyclic shifts of the first sequence having one root index when the frequency-domain spreading is performed by using the ZC sequence. For three RS symbols, a total of 18 control channels can be supported by using a DFT-based spreading code in the time domain. In this case, the control signal to be transmitted uses an orthogonal sequence having a length of 4 as the time-domain spreading code, thereby enabling coherent detection.

In order to enable coherent detection for a control signal transmitted through time/frequency-domain spreading, a control channel may have a structure satisfying the following requirements.

(1) A frequency diversity gain can be obtained through slot-based hopping.

(2) Transmission of the control channel is achieved for 1 TTI with respect to each UE.

(3) In the control signal, data (e.g., ACK/NACK signals, scheduling request, etc.) having a relatively small transmission capability and data (e.g., CQI, PMI, etc.) having a relatively large transmission capability can be both supported.

(4) Overhead caused by code assignment is small.

(5) Multi-cells can be supported through inter-cell code assignment.

When the control channel structure is designed in consideration of the above requirements, the number of OFDM symbols for the reference signal and the number of OFDM symbols for the control signal have to be taken into account for coherent detection. In transmission of the control signal through two-dimensional spreading, capability of the control channel is determined according to the number of orthogonal spreading codes with respect to the OFDM symbols for the reference signal or the OFDM symbols for the control signal. In other words, when the ZC sequence is used in the frequency domain as an orthogonal sequence, in consideration of delay spread caused by a multi-path channel characteristic, a maximum of 6 orthogonal sequences can be generated by cyclic shifting a root sequence. Within one slot, if the number of OFDM symbols for the reference signal is $N_{RS}$ and the number of OFDM symbols for the control signal is $N_{data}$, then the number of OFDM symbols for the control signal in a slot having 7 OFDM symbols is $N_{data}=7-N_{RS}$. Eventually, a maximum of 18 control channels can be supported when $(N_{RS}, N_{data})=(3,4)$ or $(N_{RS},N_{data})=(4,3)$. The requirements (1) and (2) can be satisfied when slot-based frequency hopping is achieved in the control channel in every subframe whereas a plurality of control channels can be transmitted in every slot. Consequently, the control channel requires to have a structure constructed of $(N_{RS},N_{data})=(3,4)$ or $(N_{RS},N_{data})=(4,3)$ in every slot. In particular, the reference signal and the control signal have to be effectively configured according to a time-varying characteristic so that the control channel structure is robust to a wireless communication channel environment.

FIG. 6 shows a control channel structure in which 3 OFDM symbols are arranged a reference signal.

Referring to FIG. 6, RS symbols are densely arranged in a middle portion in a structure (a). The RS symbols are equidistantly arranged in structures (b) and (c). When the three RS symbols of the structure (a) are used in channel estimation, it is difficult to cope with a fast time-varying channel characteristic and also it is difficult to maintain an orthogonal characteristic of time-domain spreading with respect to dispersed control signal symbols. As a result, performance may deteriorate in the time-varying channel environment. The structure (b) has a merit in that reliability of time-varying channel estimation is improved. The structure (b) is also relatively advantageous in maintaining the orthogonal characteristic even if time-domain de-spreading occurs. This is because the time-varying characteristic of the control signal is considered in a period of 5 OFDM symbols.

Due to a rapid time-varying channel characteristic of a UE moving in a high speed, a time-domain spreading duration for a control signal symbol may be required to be minimized. In addition, a time-domain interval of the control signal symbol may be designed to be minimized. The RS symbols are arranged in OFDM symbols located at both ends of a slot in structures (d) and (e), thereby decreasing the time-domain interval of the control signal.

Now, control signal multiplexing using a plurality of control channels, each of which uses the same radio resource, will be described.

For clarity, an ACK/NACK signal is considered as a first control signal, and a CQI is considered as a second control signal. That is, the ACK/NACK signal and/or the CQI are multiplexed and transmitted. Each control signal uses one resource block. However, this is for exemplary purposes only, and thus those ordinary skilled in the art will understand that other types of various control signals can be transmitted through the same radio resource according to the technical features of the present invention.

As mentioned above in the requirement (3), in addition to the ACK/NACK signal, transmission of the CQI which requires a relatively higher data rate than the ACK/NACK signal has to be supported in the time/frequency domains. This is because the CQI (i.e., the second control signal) generally has a large number of bits than the ACK/NACK signal (i.e., the first control signal). Unlike the ACK/NACK signal, increase in transmission capability is a more important factor in case of CQI transmission than control channel capability, and an RS structure for the CQI may be different from an RS structure for the ACK/NACK signal.

Transmission capability for CQI transmission may be increased by using only frequency-domain spreading without using time-domain spreading.

If the ACK/NACK signal and the CQI are transmitted by being multiplexed in the same radio resource (i.e., the time/frequency domains), the CQI and the ACK/NACK signal can be identified according to a cyclic shift amount of a ZC sequence. This means that the CQI and the ACK/NACK signal are spread by using cyclic shift amounts of different ZC sequences.

Since different CQI information can be transmitted for each OFDM symbol, a correlation characteristic between the RS and the CQI is different from that of ACK/NACK transmission. In addition, since the time-domain spreading is not applied to the CQI similarly to the transmission of the ACK/NACK signal, there is no problem of data de-spreading caused by the time-varying channel characteristic. In other words, the reference signal is used for coherent demodulation of a CQI symbol within one slot in CQI transmission. In addition, unlike in ACK/NACK transmission, time-domain spreading is not considered in CQI transmission. Therefore, channel estimation performance in a slot unit is an important factor.

If the control channel structure of FIG. 5 is used to carry the CQI, the ZC sequence can be transmitted by mapping the CQI symbol, instead of a time-domain spreading code, after performing IFFT. That is, transmission capability can be increased by allowing the control channel for the ACK/NACK signal to use only one-dimensional spreading rather than two-dimensional spreading and by carrying and transmitting the CQI on the time domain where spreading is not performed. Although only frequency-domain spreading has been described herein as an example, the CQI symbol may be carried on the frequency domain by using only time-domain spreading.

FIG. 7 shows an exemplary structure of a control channel for transmitting a CQI. Herein, only two RS symbols are used for the CQI.

Referring to FIG. 7, the RS symbols are carried on two OFDM symbols out of 7 OFDM symbols, and CQI symbols $CQI_1$, $CQI_2$, $CQI_3$, $CQI_4$, and $CQI_5$ are respectively carried on the remaining 5 OFDM symbols. If one quadrature phase shift keying (QPSK) symbol is carried on one OFDM symbol, 2-bit CQI information can be carried on each OFDM symbol. Therefore, a 10-bit CQI can be transmitted through one slot.

If a ZC sequence that is a frequency-domain spreading code is used to spread the CQI in a frequency domain, the CQI symbols are carried on each OFDM symbol after performing IFFT on the ZC sequence.

FIG. 8 shows a CQI multiplexing method using the channel structure (a) of FIG. 6.

Referring to FIG. 8, a CQI uses two RS symbols. An ACK/NACK UE (i.e., UE #p) estimates a channel by utilizing three RS symbols and transmits an ACK/NACK signal by using the remaining 4 OFDM symbols. A CQI UE (i.e., UE #q) uses two OFDM symbols at both ends of three RS symbols for ACK/NACK as RS symbols for CQI, and uses one of three OFDM symbols assigned for the RS symbols for ACK/NACK to transmit the CQI.

A total of 5 CQI symbols can be transmitted in one slot. The ACK/NACK signal can be distinguished from the CQI according to a cyclic shift amount of a ZC sequence used in the frequency domain. In a method of selecting two RS symbols for CQI from three RS symbols for ACK/NACK, a better efficiency can be obtained when two RS symbols at both ends are used to improve channel estimation reliability in a slot unit.

FIG. 9 shows a CQI multiplexing method using the channel structure (b) of FIG. 6.

Referring to FIG. 9, a CQI uses two RS symbols. An ACK/NACK UE (i.e., UE #p) estimates a channel by utilizing three RS symbols arranged equidistantly and transmits an ACK/NACK signal by using the remaining 4 OFDM symbols. A CQI UE (i.e., UE #q) uses two OFDM symbols at both ends of three RS symbols for ACK/NACK as RS symbols for CQI, and uses one of three OFDM symbols assigned for the RS symbols for ACK/NACK in order to transmit the CQI.

FIG. 10 shows a CQI multiplexing method using the channel structure (c) of FIG. 6.

Referring to FIG. 10, a CQI uses two RS symbols. An ACK/NACK UE (i.e., UE #p) estimates a channel by utilizing three RS symbols arranged equidistantly and transmits an ACK/NACK signal by using the remaining 4 OFDM symbols. A CQI UE (i.e., UE #q) uses two OFDM symbols at both ends of three RS symbols for ACK/NACK as RS symbols for CQI, and uses one of three OFDM symbols assigned for the RS symbols for ACK/NACK in order to transmit the CQI.

FIG. 11 shows a CQI multiplexing method using the channel structure (d) of FIG. 6.

Referring to FIG. 11, a CQI uses two RS symbols. An ACK/NACK UE (i.e., UE #p) estimates a channel by utilizing three RS symbols arranged at both ends of a slot and transmits an ACK/NACK signal by using the remaining 4 OFDM symbols. A CQI UE (i.e., UE #q) uses two OFDM symbols at both ends of three RS symbols for ACK/NACK as RS symbols for CQI, and uses one of three OFDM symbols assigned for the RS symbols for ACK/NACK in order to transmit the CQI.

FIG. 12 shows a CQI multiplexing method using the channel structure (e) of FIG. 6.

Referring to FIG. 12, a CQI uses two RS symbols. An ACK/NACK UE (i.e., UE #p) estimates a channel by utilizing three RS symbols arranged at both ends of a slot and transmits an ACK/NACK signal by using the remaining 4 OFDM symbols. A CQI UE (i.e., UE #q) uses two OFDM symbols at both ends of three RS symbols for ACK/NACK as RS symbols for CQI, and uses one of three OFDM symbols assigned for the RS symbols for ACK/NACK in order to transmit the CQI.

Meanwhile, one RS symbol can be used for the CQI. One RS symbol located in the center of the three RS symbols for ACK/NACK can be used as the RS symbol for CQI. The remaining two RS symbols can be transmitted by being mapped to the CQI symbols respectively.

FIG. 13 shows arrangement of a reference signal for ACK/NACK and a reference signal for CQI. Various embodiments are shown in which three RS symbols for ACK/NACK and two RS symbols for CQI are arranged in one slot.

Referring to FIG. 13, the RS symbols for ACK/NACK and the RS symbols for CQI can be arranged in the same OFDM symbol or can be arranged in contiguous OFDM symbols. In addition, the RS symbols for ACK/NACK and the RS symbols for CQI can be arranged in OFDM symbols separated from each other.

A first control signal (i.e., ACK/NACK) applied with two-dimensional spreading can be used to maximize UE capability. On the other hand, a second control signal (i.e., CQI) requiring transmission capability higher than that of the first control signal can be used to multiplex the first and second control signals to one control signal by using one-dimensional spreading. When the second control signal is used, transmission capability much higher than that of the first control signal can be ensured by reducing the number of RS symbols.

Although it has been described that $(N_{RS}, N_{data}) = (3,4)$ as an example, the present invention may also apply to other cases when $(N_{RS}, N_{data})$ is set to any arbitrary numbers. It will be assumed in the following descriptions that $(N_{RS}, N_{data}) = (4,3)$.

FIG. 14 shows a control channel structure in which 4 OFDM symbols are arranged for a reference signal.

Referring to FIG. 14, RS symbols are densely arranged in a middle portion in structures (A) and (B). The RS symbols are equidistantly arranged in structures (C) and (D). The use of the structures (A) and (B) may result in deterioration of channel estimation reliability caused by a rapid time-varying channel characteristic of a UE moving in a high speed and may also result in impairment of an orthogonal characteristic caused by time-domain de-spreading. A structure of $(N_{RS}, N_{data}) = (4,3)$ can increase flexibility of channel estimation of the RS symbols while maintaining UE capability and a transmittable symbol interval which are the same as those of a structure of $(N_{RS}, N_{data}) = (3,4)$. Therefore, the structure of $(N_{RS}, N_{data}) = (4,3)$ can further effectively cope with the time-varying channel environment. Although transmission capability of the control signal is reduced in comparison with a case of using three RS symbols, there is an advantage in that the orthogonal characteristic can be maintained due to increase in the channel estimation reliability and decrease in a time-domain spreading duration.

As mentioned above in the requirements (3), there is a need to support a case where a specific UE has to transmit a control signal (e.g., CQI) requiring a relatively high data rate in the same time/frequency domains. Assume that not only the ACK/NACK signal (i.e., the first control signal) but also the CQI (i.e., the second control signal) are multiplexed in the control channel. The CQI (i.e., the second control signal) has a greater number of bits than the ACK/NACK signal (i.e., the first control signal). Unlike the ACK/NACK signal, increase in transmission capability is a more important factor in case of CQI transmission than UE capability, and a reference signal for the CQI may have a different structure from a reference signal for the ACK/NACK signal. The CQI transmission uses only frequency-domain spreading and does not use time-domain spreading.

If a ZC sequence that is an orthogonal spreading code in the frequency domain is assigned so that the ACK/NACK signal and the CQI are transmitted together through the same radio resource, the CQI and the ACK/NACK signal use cyclic shifts of different ZC sequences.

Since different CQI information can be transmitted for each OFDM symbol, a correlation characteristic between the RS and the CQI is different from that of ACK/NACK transmission. In addition, since the time-domain spreading is not applied to the CQI symbol similarly to the transmission of the ACK/NACK signal, there is no problem of data de-spreading caused by the time-varying channel characteristic.

The reference signal of a CQI UE is used for coherent demodulation of a CQI symbol within one slot, and time-domain spreading is not considered in CQI transmission unlike in ACK/NACK transmission. Therefore, channel estimation performance in a slot unit is an important factor. Accordingly, a CQI transmission method is determined according to a reference signal used in the CQI with respect to 4 RS symbols for ACK/NACK.

FIG. 15 shows a CQI multiplexing method using the channel structure (C) of FIG. 14. In the structure (C), if positions of RS symbols for ACK/NACK are indicated by (0,2,4,6) and RS symbols for CQI are arranged overlapping with the positions of the RS symbols for ACK/NACK, two RS symbols for CQI can be arranged in 6 different ways. For example, the two RS symbols for CQI can be arranged at positions (0,6), (0,4), (2,6).

Referring to FIG. 15, two RS symbols for CQI are arranged at (0,6). An ACK/NACK UE (i.e., UE #p) estimates a channel by utilizing 4 RS symbols and transmits an ACK/NACK signal by using the remaining 3 OFDM symbols. A CQI UE (i.e., UE #q) uses two OFDM symbols at both ends of 4 RS symbols for ACK/NACK as RS symbols for CQI, and uses two of 4 OFDM symbols assigned to the RS symbols for ACK/NACK in order to transmit the CQI.

FIG. 16 shows a CQI multiplexing method using the channel structure (D) of FIG. 14. In the structure (D), if positions of RS symbols for ACK/NACK are indicated by (0,1,5,6) and RS symbols for CQI are arranged overlapping with the positions of the RS symbols for ACK/NACK, two RS symbols for CQI can be arranged in 6 different ways. For example, the two RS symbols for CQI can be arranged at (0,6), (0,5), (1,6), etc.

Referring to FIG. 16, two RS symbols for CQI are arranged at (1,5). An ACK/NACK UE (i.e., UE #p) estimates a channel by utilizing 4 RS symbols and transmits an ACK/NACK signal by using the remaining 3 OFDM symbols. A CQI UE (i.e., UE #q) uses two OFDM symbols out of 4 RS symbols for ACK/NACK as RS symbols for CQI, and uses two of 4 OFDM symbols assigned to the RS symbols for ACK/NACK in order to transmit the CQI.

The aforementioned control channel based on the $(N_{RS}, N_{data})=(3,4)$ slot or the $(N_{RS},N_{data})=(4,3)$ slot can be frequency-hopped in a slot unit. A frequency diversity gain can be obtained by transmitting the same slot through different frequencies.

An additional gain can be obtained by applying frequency hopping to different slot structures. The $(N_{RS},N_{data})=(3,4)$ slot can ensure flexibility for control signal processing by assigning 4 OFDM symbols in control signal transmission. The $(N_{RS},N_{data})=(4,3)$ slot can increase channel estimation reliability using 4 RS symbols. The additional gain can be obtained when transmission is made by combining the $(N_{RS}, N_{data})=(3,4)$ slot and the $(N_{RS},N_{data})=(4,3)$ slot.

FIG. 17 shows an example of slot-based frequency hopping.

Referring to FIG. 17, frequency hopping is performed using the $(N_{RS},N_{data})=(3,4)$ slot of FIG. 9 and the $(N_{RS}, N_{data})=(4,3)$ slot of FIG. 16. The $(N_{RS},N_{data})=(3,4)$ slot is first transmitted followed by the $(N_{RS},N_{data})=(4,3)$ slot which is the remaining slot to be frequency hopped.

Overhead resulted from code assignment in the same slot structure can be maintained without alteration. A code having a length of 3 or 4 is used according to a length of time-domain spreading for a reference signal or a control signal. Therefore, additional code assignment or new code design is not required.

Although it has been described herein that transmission is made by combining the slot of FIG. 9 and the slot of FIG. 16, the present invention is not limited thereto. Thus, transmission may be made by combining the aforementioned various types of slot structures. In addition, transmission may be made by multiplexing not only the ACK/NACK signal but also the CQI.

A method for improving channel reliability of a fast-moving UE, for maintaining orthogonality of a spreading code when data is de-spread, and for maximizing a spreading gain of a slow-moving UE can be considered within one subframe. Therefore, an environment where a UE moves in a variety of speeds and resultant changes in a channel can be flexibly dealt with.

In the aforementioned control channel (i.e., ACK/NACK channel) structure, a reference signal and a control signal are configured by considering combination of $(N_{RS},N_{data})=(N_{k+1},N_k)$ or $(N_{RS},N_{data})=(N_k,N_{k+1})$ among odd-numbered $N_S(=2*N_{k+1})$ OFDM symbols. However, there is no limit in the number of OFDM symbols included in the slot. For example, even-numbered OFDM symbols may be included in one slot if an extended cyclic prefix (CP) is used.

FIG. 18 shows a control channel structure for a slot including 6 OFDM symbols. Herein, one slot includes 6 OFDM symbols, and $(N_{RS},N_{data})=(3,3)$.

Referring to FIG. 18, three RS symbols can be arranged in 6 OFDM symbols according to six structures, i.e., structures (1) to (6).

Although the three RS symbols are arranged in one slot herein, it is also possible to arrange one or two RS symbols in one slot.

FIG. 19 shows an example of CQI multiplexing using the control channel structure of FIG. 18. Herein, one RS symbol is used for CQI transmission.

Referring to FIG. 19, the RS symbol for CQI is arranged in one OFDM symbol included in a slot in which three RS symbols for ACK/NACK are arranged.

FIG. 20 shows another example of CQI multiplexing using the control channel structure of FIG. 18. Herein, two RS symbols are used for CQI transmission.

Referring to FIG. 20, the two RS symbols for CQI are arranged in two OFDM symbols included in a slot in which three RS symbols for ACK/NACK are arranged. Accordingly, the number of RS symbols for CQI can be increased if improvement of channel estimation reliability is an important factor, for example, when a fast-moving UE is used.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting a control signal in a wireless communication system, performed by a user equipment, the method comprising:

determining a cyclic shift value for a first control signal in a multiplexed resource block, wherein the cyclic shift value for the first control signal is determined so that the first control signal and a second control signal are identified by different cyclic shift values of a base sequence in the multiplexed resource block;

generating a spread control signal by spreading the first control signal with a cyclic shifted sequence which is obtained by cyclically shifting the base sequence with the cyclic shift value for the first control signal; and transmitting the spread control signal in the multiplexed resource block, wherein the multiplexed resource block is defined by a plurality of subcarriers in a frequency domain and a slot in a time domain, the slot comprising a plurality of orthogonal frequency division multiplexing (OFDM) symbols, and wherein a number of OFDM symbols used for a reference signal of the first control signal in the multiplexed resource block is greater than a number of OFDM symbols used for a reference signal of the second control signal in the multiplexed resource block.

2. The method of claim 1, wherein the OFDM symbols used for the reference signal of the first control signal in the multiplexed resource block are not overlapped with the OFDM symbols used for the reference signal of the second control signal in the multiplexed resource block.

3. The method of claim 1, wherein the first control signal is spread with the cyclic shifted sequence in frequency domain.

4. The method of claim 1, wherein a number of bits for the first control signal is different from a number of bits for the second control signal.

5. The method of claim 1, wherein the first control signal is a ACK/NACK signal for hybrid automatic repeat request (HARQ) and the second control signal is a channel quality indicator (CQI).

6. The method of claim 1, wherein the base sequence is a Zadoff-Chu (ZC) sequence.

7. A transmitter comprising a Inverse fast Fourier transform (IFFT) unit for performing IFFT on a frequency domain signal to generated a transmit signal, wherein the frequency domain signal is generated by:
   determining a cyclic shift value for a first control signal in a multiplexed resource block, wherein the cyclic shift value for the first control signal is determined so that the first control signal and a second control signal are identified by different cyclic shift values of a base sequence in the multiplexed resource block; and
   generating the frequency domain signal by spreading the first control signal with a cyclic shifted sequence which is obtained by cyclically shifting the base sequence with the cyclic shift value for the first control signal,
   wherein the multiplexed resource block is defined by a plurality of subcarriers in a frequency domain and a slot in a time domain, the slot comprising a plurality of orthogonal frequency division multiplexing (OFDM) symbols, and
   wherein a number of OFDM symbols used for a reference signal of the first control signal in the multiplexed resource block is greater than a number of OFDM symbols used for a reference signal of the second control signal in the multiplexed resource block.

8. The transmitter of claim 7, wherein the OFDM symbols used for the reference signal of the first control signal in the multiplexed resource block are not overlapped with the OFDM symbols used for the reference signal of the second control signal in the multiplexed resource block.

9. The transmitter of claim 7, wherein the first control signal is spread with the cyclic shifted sequence in frequency domain.

10. The transmitter of claim 7, wherein a number of bits for the first control signal is different from a number of bits for the second control signal.

11. The transmitter of claim 7, wherein the first control signal is a ACK/NACK signal for hybrid automatic repeat request (HARQ) and the second control signal is a channel quality indicator (CQI).

12. The transmitter of claim 7, wherein the base sequence is a Zadoff-Chu (ZC) sequence.

* * * * *